March 13, 1928. 1,662,516

P. HUSTADT ET AL

MACHINE FOR TEMPERING SAW BLADES, PLANE KNIVES, AND SIMILAR TOOLS

Filed July 10, 1923

Patented Mar. 13, 1928.

1,662,516

UNITED STATES PATENT OFFICE.

PAUL HUSTADT AND KARL HUSTADT, OF REMSCHEID-HASTEN, GERMANY.

MACHINE FOR TEMPERING SAW BLADES, PLANE KNIVES, AND SIMILAR TOOLS.

Application filed July 10, 1923. Serial No. 650,694.

This invention aims to provide an improved machine and method to be used in tempering and straightening thin cutting tools, such as circular and other saws, paper cutters, plane-knives and the like, and to remove warping which has resulted from the previous steps of manufacture without injuring the metal, to the end that the resulting product shall be of uniform character.
In known tempering methods the heating of the tools is irregular due to the difficulty of controlling the gas or coal fires generally used, and the cooling is likewise irregular because there is no way of removing the entire article substantially instantaneously from the heat treating apparatus. These irregularities of treatment cause the tools to warp, which in turn necessitates a final straightening, generally accomplished by heating and hammering. This final straightening is applied only to the warped spots, causing irregularities of appearance and of internal stress, one result of which is that a saw may warp again after tooth cutting and setting, so that the blade may have to be straightened a second time.

The illustrative embodiment of the invention hereinafter described provides for simultaneous tempering, setting and straightening of the tools by pressing them between electrically heated plates, thermal and electrical measuring instruments being provided to permit close supervision of the heating throughout the treatment. Provision is also made for uniform cooling of the tools at the conclusion of the treatment by causing all portions of the tool to be simultaneously released from pressure and removed from the heat.
To this end the electrically heated plates are advantageously mounted in a movable frame, capable of rotation from a horizontal to a vertical plane. At the conclusion of the tempering and straightening treatment, the movable frame being in a vertical position, the pressure is released, allowing the tool to fall out, so that all parts of it are simultaneously and suddenly removed from the heat and pressure, thus avoiding uneven treatment which would result from slower withdrawal, and promoting uniformity in the product.

Suitable gearing may be used for rotating the movable frame.

An improved tempering machine for carrying out our process is shown in the accompanying drawing, wherein.

Figure 1:
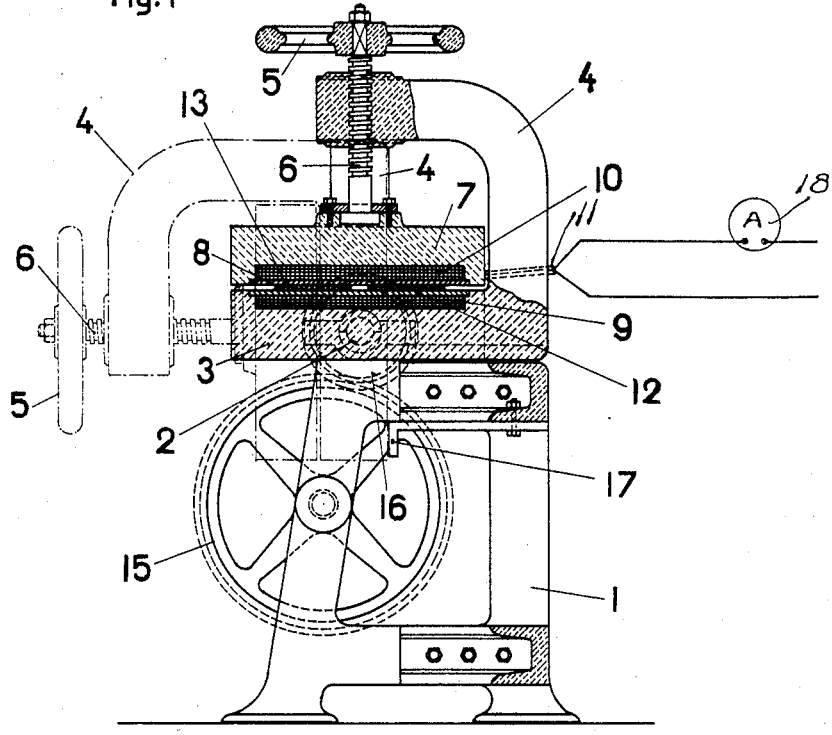
Fig. 1 is a section on line A—B of Fig. 2, the vertical position of the movable frame being indicated by dotted lines, and Figure 2:
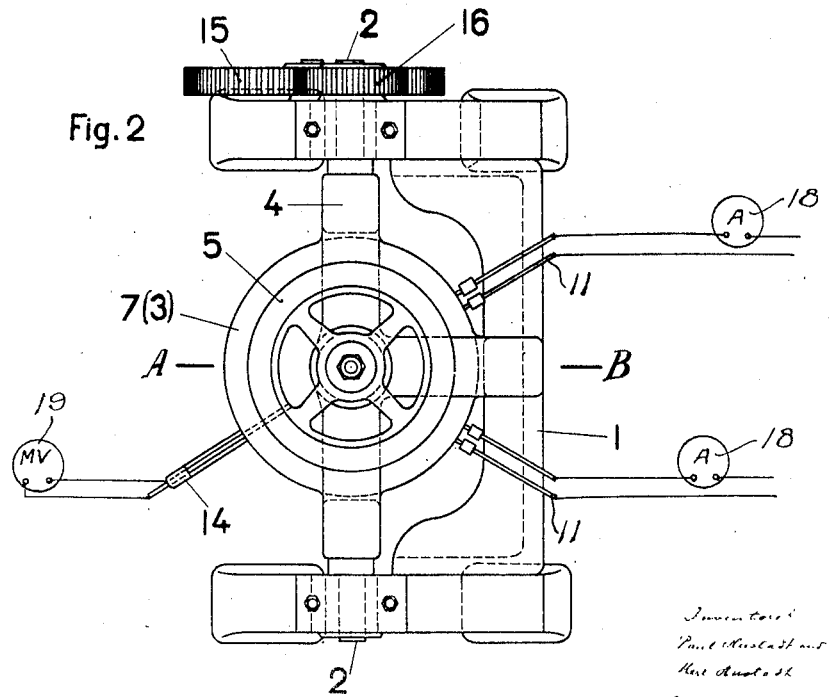
Fig. 2 is a plan view of the complete machine in position to receive a blank.

Our machine comprises a stationary base 1 of any suitable construction, on which a top press-frame 4 is rotatably mounted by horizontal journals 2. In the form here shown this top press-frame is a unitary structure comprising a bottom plate 3 and three inverted L-shaped side members 4 whose lower ends are secured to said plate 3 and the inner ends of whose upper arms meet above the center of the plate 3, as shown in Fig. 2. Two of these side members are in a common plane perpendicular to the bottom plate 3, and have horizontal journals 2 secured near their lower ends, said journals turning in bearings on the base 1. The third side member is in a plane perpendicular to that of the other two and to the plate 3, and besides strengthening the movable press-frame, serves as a weight helping to hold said frame in a horizontal position shown by the solid lines of Fig. 1, and also engages by its lower end against part of the top of base 1 which serves as a stop in said horizontal position.

Opposed to the bottom plate 3 is a top plate 7 capable of being raised and lowered by a vertical centrally-placed threaded spindle 6, the said spindle working in an internally-threaded hole at the upper junction of the side members 4. The spindle 6 is turned by a hand wheel 5 at its top.

Electric heating spirals 9 and 10 are imbedded in the opposing faces of plates 3 and 7, and covered by face plates 12 and 13, respectively. Cables 11 conduct electricity to the heating elements, ammeters 18 being provided in the circuits to indicate the current drop caused by increase of temperature, so that uniform heat may be maintained. A pyrometer 14, connected with a millivoltmeter 19, serves for direct measurement of the temperature.

Suitable mechanism, as the gear wheels 15, 16, may be provided to move the press-frame and plates 3, 7, as a unit, from a horizontal to a vertical position and vice-versa. An abutment 17, fixed to the base 1, stops the press-frame in its vertical position, shown by dotted lines in Fig. 1, by engaging the bottom of the lower plate 3.

In operation, the movable press-frame being in the horizontal position, with the upper plate 7 raised, the saw or other tool 8 to be treated is laid on the lower plate 3, the upper plate 7 is screwed down and the current turned on the heating elements 9 and 10. As the temperature rises the pressure is gradually increased by turning the hand-wheel 5 so that the tempering and straightening are carried on simultaneously and progressively.

At any time prior to the completion of the treatment the press-frame is moved to the vertical position without interfering with the treatment.

To stop the treatment, pressure is released by unscrewing the spindle 5, thus allowing the tool 8 to drop out. In this way the removal of the tool from the heat and pressure is practically instantaneous so that all portions of both sides are always simultaneously subjected to the same conditions, thus avoiding any distortion which would be occasioned by relatively slow withdrawal, handling by tongs, etc., any or all of which might cause visible or invisible irregularities in the finished product.

The invention is not restricted to the method and apparatus described, as it is obvious that other methods and other apparatus may be adapted to the production of saws, cutters and knives having the characteristics described without departing from the invention.

We claim the following as our invention:

1. A machine for tempering saw blades and similar tools comprising in combination, a lower stationary frame part, an upper frame part pivotally mounted on said lower frame part, said upper frame part including inverted L-shaped members having joined upper horizontal portions, means for tilting said upper part through an arc of 90°, a stationary lower press plate in said oscillatable upper frame part, a screw spindle threaded through the junction of said L-shaped members of said oscillatable frame part, an upper press plate adapted to be moved toward and from said lower press plate by said screw spindle, a heating plate in each of said press plates adapted to hold the work to be placed between the same and transmit heat thereto, a heating coil in each of said press plates, and means for supplying electric current to said heating coils.

2. An apparatus for tempering and removing irregularities from previously-hardened saw blades, knives, cutters and other thin articles by treatment involving the simultaneous application of heat and pressure, comprising a stationary base, an article-treating press-frame so pivotally mounted thereon as to be capable of tilting between an article-receiving and an article-discharging position without affecting the treatment of said articles, and means in said press-frame for applying said pressure and heat, adapted to allow substantially instantaneous release of said articles from treatment.

3. Means for tempering and straightening thin cutting tools of the character described comprising press-plates mounted for gradual movement towards each other and provided with electrical heating elements, indicating means for said heating elments, said press-plates being further so mounted as to be capable of simultaneous rotation about a substantially horizontal axis without change of position relative to one another, and means for rapidly releasing said press-plates and discharging said tools therefrom.

4. An apparatus for tempering and removing irregularities from previously-hardened saw blades, knives, cutters and other thin articles by treatment involving the simultaneous application of heat and pressure, comprising a stationary base, an article-treating press-frame so mounted thereon as to be capable of movement, without affecting the treatment of said articles, from an article-receiving position such that said articles will remain in said press-frame by force of gravity to an article-discharging position such that said articles will drop out of said press-frame upon release of pressure, and means in said press-frame for applying said pressure and heat, adapted to allow substantially instantaneous release of said articles from treatment.

5. Apparatus for tempering and straightening thin articles of the character described, comprising a press-frame 4, press-plates 3, 7, mounted for relative movement in said frame, pressure applying means 6 for said plates, electrically heated face plates 12, 13, carried by said press-plates, electric conductors 11 leading from a source of electric-heating current, and indicating means therefor, in combination with heat-measuring means 14 for indicating the temperature of said face plates, said frame 4 being pivoted for rotation about a substantially horizontal axis between a position wherein said plates 3, 7, are substantially horizontal and a position wherein the said plates are substantially vertical.

6. An apparatus for simultaneously tempering and removing irregularities from previously-hardened saw blades, knives, cutters and other thin articles comprising a base 1, a frame 4 mounted thereon by horizontal trunnions 2, a plate 3 carried by said frame, a plate 7 mounted on said frame for gradual movement towards and from said plate 3 by means of a screw-threaded spindle 6, electric heating elements 9, 10 in said plates 3, 7 respectively, and indicating means cooperating with said heating elements.

In testimony whereof we affix our signatures.

PAUL HUSTADT.
KARL HUSTADT.